United States Patent [19]

Granryd

[11] 4,133,480

[45] Jan. 9, 1979

[54] CONVENIENCE ANTI-WHEEL SPIN DEVICE FOR RUBBER TIRED VEHICLES INCLUDING A WINCHING ACCESSORY

[76] Inventor: Thorvald G. Granryd, 825 N. Sheridan Rd., Lake Forest, Ill. 60045

[21] Appl. No.: 796,875

[22] Filed: May 16, 1977

Related U.S. Application Data

[63] Continuation-in-part of Ser. No. 640,254, Dec. 12, 1975, abandoned.

[51] Int. Cl.² ............................................. E01B 23/00
[52] U.S. Cl. .................................. 238/14; 152/213 A; 180/7 R
[58] Field of Search ............... 152/208, 213 R, 213 A; 180/7; 238/14

[56] References Cited

U.S. PATENT DOCUMENTS

| 1,241,679 | 10/1917 | Sypkens | 238/14 |
| 1,289,880 | 12/1918 | Newman | 238/14 |
| 1,432,077 | 10/1922 | Metcalf | 238/14 |
| 1,561,806 | 11/1925 | Thomas | 238/14 |
| 3,289,939 | 12/1966 | Martinov | 238/14 |
| 3,630,440 | 12/1971 | Sams | 238/14 |
| 3,708,117 | 1/1973 | Coale | 238/14 |
| 3,749,309 | 7/1973 | Becker | 238/14 |
| 3,910,491 | 10/1975 | Ducharme | 238/14 |

FOREIGN PATENT DOCUMENTS

13154 9/1916 United Kingdom .................. 180/7 R

Primary Examiner—Albert J. Makay
Assistant Examiner—Donald W. Underwood
Attorney, Agent, or Firm—August E. Roehrig, Jr.

[57] ABSTRACT

An anti-wheel spin device for rubber tired vehicles including a pair of mattings or pads of different lengths coupled together to prevent them from propelling against the vehicle by a spinning wheel. A winching accessory is also provided for securing one of the mattings or pads to a wheel to be extricated when the force required to move the vehicle exceeds the tractive force developed between the matting or pad and the wheel.

12 Claims, 14 Drawing Figures

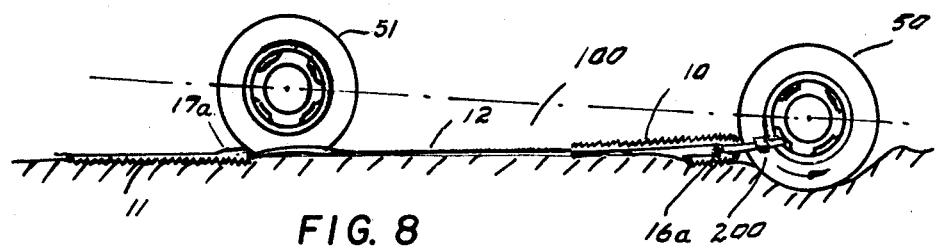
FIG. 8
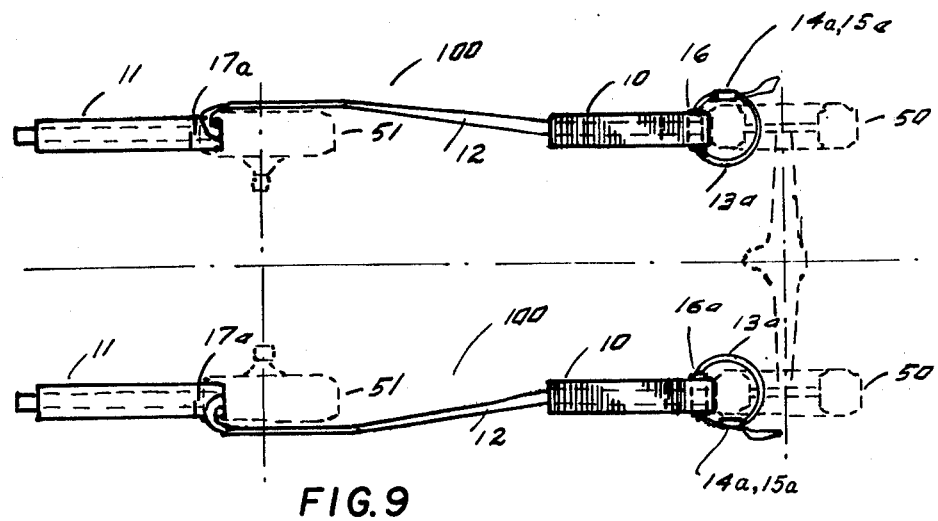
FIG. 9
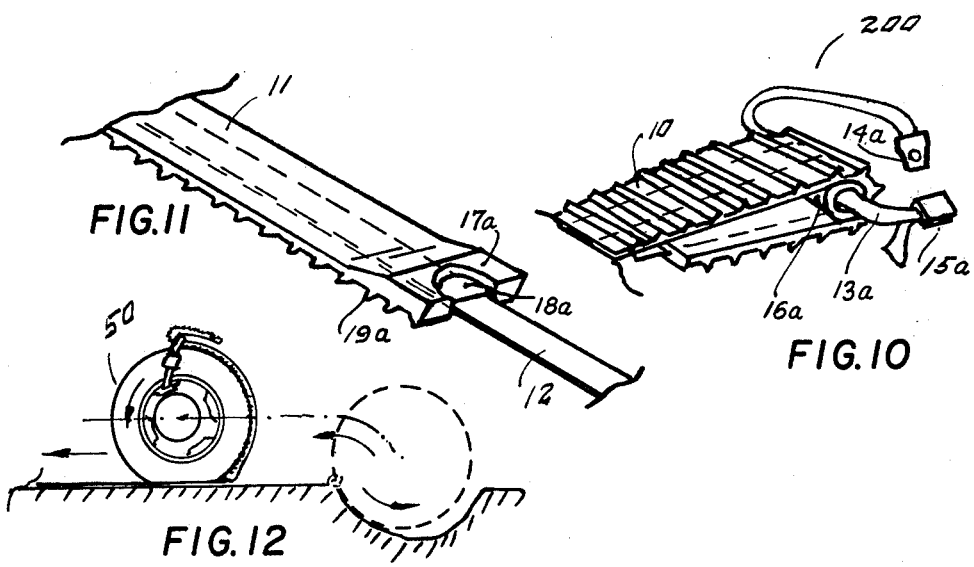
FIG. 11
FIG. 10
FIG. 12

CONVENIENCE ANTI-WHEEL SPIN DEVICE FOR RUBBER TIRED VEHICLES INCLUDING A WINCHING ACCESSORY

REFERENCE TO RELATED APPLICATIONS

This application is a continuation-in-part of application Ser. No. 640,254, filed Dec. 12, 1975 and now abandoned.

BACKGROUND OF THE INVENTION

This invention relates in general to an auxiliary anti-wheel spin device for rubber tired vehicles intended to be used in case such a vehicle lacks sufficient ground adhesion to propel itself.

More specifically this invention relates to an anti-wheel spin device which utilizes the weight exerted upon non-driving wheels for its functioning and is capable of accommodating vehicles having differing wheelbases. The invention also includes a winching accessory for use when the force required to extricate the vehicle exceeds the tractive force between the device and the vehicle wheel.

Devices of this kind in current use generally comprise a pair of mattings or pads, to be placed in front of the driving wheels. Although these devices contain various types of patterns or gripping characteristics to prevent them from being propelled away from the vehicle by a spinning wheel, they have been found to be less than effective in many situations. Also these devices require substantial tooling for their manufacture, a factor which adversely affects their commercial price.

Since it appears that devices of this kind all have one or more disadvantages, an improvement obviating these difficulties is long-awaited in the field. In addition, even though the anti-wheel spin device disclosed herein utilizes transversely corrugated elastomeric material to obtain the highest practical coefficient of friction against a tire, there are predicaments - such as being in a ditch or severely mired - when the resistance of the vehicle to movement exceeds the tractive force that is developed between the traction mattings and the driving tires, resulting in tire spin.

From observing such severe situations it has been found that by the addition of the winching accessory to the anti-wheel spin device such tire spin can be eliminated regardless of the prevailing coefficient of friction. In fact, the anti-wheel spin device in combination with the rotating driving wheels, becomes a winching device.

SUMMARY OF THE INVENTION

It is, therefore, an object of this invention to improve upon convenience anti-wheel spin devices for rubber tired vehicles.

Another object of this invention is to obtain an anti-wheel spin device, utilizing the weight exerted upon the non-driving wheels to contribute to its effectiveness.

A further object of this invention is to provide a lightweight, compact, and rustproof device capable of accommodating vehicles having differing wheelbases.

Another object is to combine a vehicle's driving wheels with an anti-wheel spin device to form a winch for extricating the vehicle.

Another object of the invention is to provide a lightweight and portable winching device that fits various sizes of rubber tired vehicles.

A further object of the invention is to simply and strongly secure a driving wheel to the traction mattings of an anti-wheel spin device.

These and other objects are attained with the present invention wherein there is provided matting and coupling means, arranged in novel combination to assure effective operation for different models of vehicles, each of said means having sufficient strength characteristics to withstand abuse; the matting and coupling means connected to each other by molding or by adhesive or other commonly used fastening means, also having sufficient strength to withstand abuse. A winching accessory is also provided for securing one of the mattings or pads to a wheel to be extricated when the force required to move the vehicle exceeds the tractive force developed between the matting or pad and the wheel.

DESCRIPTION OF THE DRAWINGS

Further objects of the invention, together with additional features contributing thereto and advantages accruing therefrom, will be apparent from the following description of preferred embodiments of the invention which are shown in the accompanying drawings with like reference numerals indicating corresponding parts throughout, wherein:

FIG. 1 is a side elevational view of an anti-wheel spin device as intended for a passenger car or the like;

FIG. 8 is a side elevational view of the device shown in FIGS. 1, 2 and 3, with the winching accessory installed;

FIG. 9 is a top plan view of the device shown in FIG. 8;

FIG. 10 is a perspective view of a traction matting folded over wheel securing means;

FIG. 11 is a perspective view of a portion of traction matting or anchoring matting, emphasizing the anchoring shoe as an integral part thereof;

FIG. 12 is a side elevational view illustrating the position of the traction matting upon a driving wheel after a vehicle has been extricated;

DESCRIPTION OF THE PREFERRED EMBODIMENTS

Figure 1:
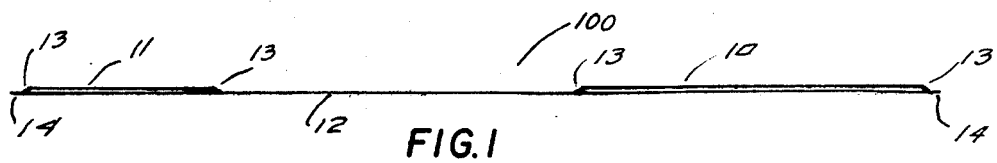
Figure 2:
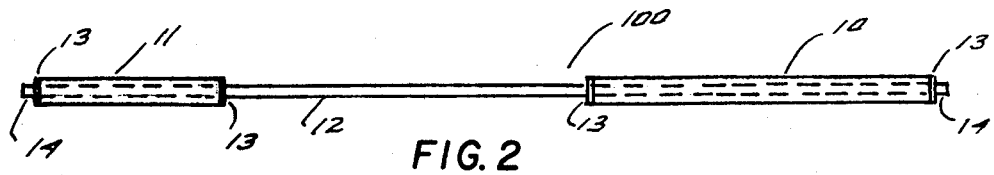
FIG. 2 is a top plan view of the device shown in FIG. 1.

Referring now to FIGS. 1 and 2 there is shown an anti-wheel spin device 100 having two matting means 10 and 11 and coupling means 12, each securely fastened to each other by conventional fastening means, such as an adhesive, molding, or other known securing means, not numerated in the drawings.

As is well known, during a typical predicamental situation of the nature described in the foregoing, one and often both, of the driving wheels of a vehicle will merely spin when attempting to extricate the vehicle from a ground condition which does not provide sufficient coefficient traction. Frequently such spinning action will cause added difficulties for the vehicles by further digging into the ground.

It is also well known that rubber tired vehicles normally are equipped with a differential assembly connecting their opposite driving wheels. The presence of this kind of assembly necessitates that the device 100 must normally be used as a pair, for the reasons known in the art.

Proceeding now further to one of the preferred embodiments, as shown in FIGS. 1 and 2, the mattings 10 and 11 are identical in cross section and strength characteristics and consist of commercially available industrial elastomeric material, such as having a durometer reading of 70 to 80, with the free terminal end of each having a chamfer 13 as shown. This chamfer serves to promote ease of insertion at the juncture of the tire and the ground. The terminal end of each matting 10 and 11 which is joined to the coupling means 12 is formed to provide an abutment 17a, as best shown in the enlarged view of FIG. 11. The abutment or anchoring shoe 17a is made of an elastomeric material such as the mats 10 and 11, and molded as an integral part of same to provide a secure anchor for the mat which is positioned in front of the non-driving wheel. A recess 18a is formed in the anchoring shoe to provide a sufficient space for folding the coupling webbing 12 backwards upon itself to establish rubber-to-rubber bite or contact between the matting and the non-driving wheel when the devices are being installed for use.

The coupling means 12, a component which must be capable of withstanding high forces, preferably consists of commercially available seat belt webbing, a material particularly well suited for this function. By virtue of Federal, SAE and State specifications, this material will have adequate tensile strength for this application (per SAE Standard J4c, Type 1 and Type 2, the webbing shall have a breaking strength of not less than 6000 lbs. and 5000 lbs. respectively). Also, its favorable elongation and abrasion resistance specifications add to its functional attractiveness as does its thinness. This latter serves to ease insertion at the juncture of tires and the ground as the webbing extends a short distance beyond the outer ends of mattings 10 and 11, identified by numeral 14 in FIGS. 1 and 2. Also since this material is produced in great quantities annually it may be obtained at reasonable cost. Additionally, it is readily foldable whereby it may be used singly, as explained below.

Figure 3:
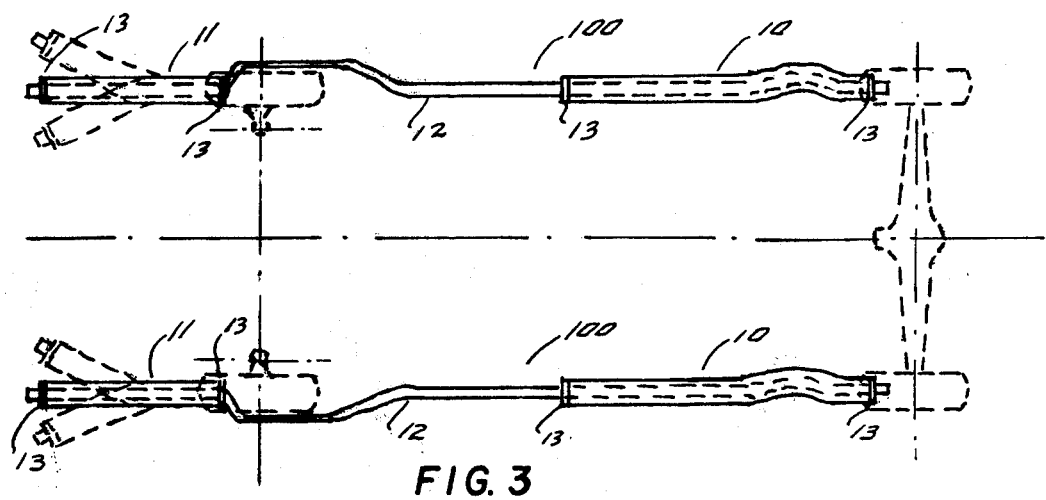
FIG. 3 is a top plan view of the device shown in FIG. 1 positioned for use on a passenger car or the like having relatively long wheelbase.

Referring to FIG. 3 anchoring points are established immediately in front of each non-driving wheel by folding the flexible coupling means 12 flat upon itself and then outside and along said wheels as shown there and also illustrated in FIG. 9.

Figure 4:
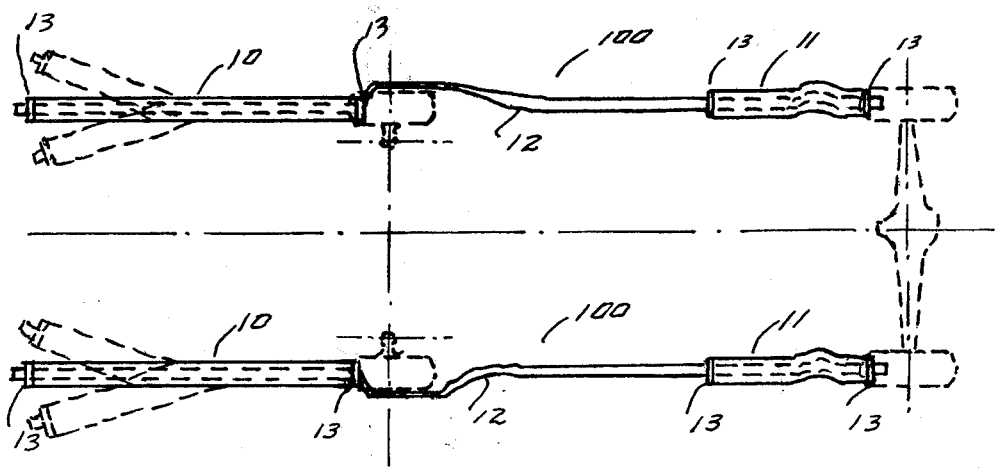
FIG. 4 is a top plan view of the same device as shown in FIG. 3, but positioned for use on a passenger car or the like having a relatively short wheelbase.

By providing what may be termed excessive length for the matting 10, when the device is being used on vehicles of relatively short wheelbase, a fixed length and common configuration, suitable for use also on vehicles having relatively longer wheelbase, may be achieved. This design approach was discovered in that the amount of "slack", or degree of loop in the assembly, when positioned between front and rear wheels before actual operation, may be of different magnitude depending upon wheelbase, without detracting from its effectiveness. Also, the method of reversible usage is generally illustrated by comparing FIGS. 3 and 4. As shown matting 10 is relatively longer than is matting 11. When using the device for vehicles with longer wheelbases, the longer matting 10 is positioned toward the driving wheel whereas for use in vehicles having shorter wheelbases the shorter matting 11 is positioned toward the driving wheel.

Figure 5:
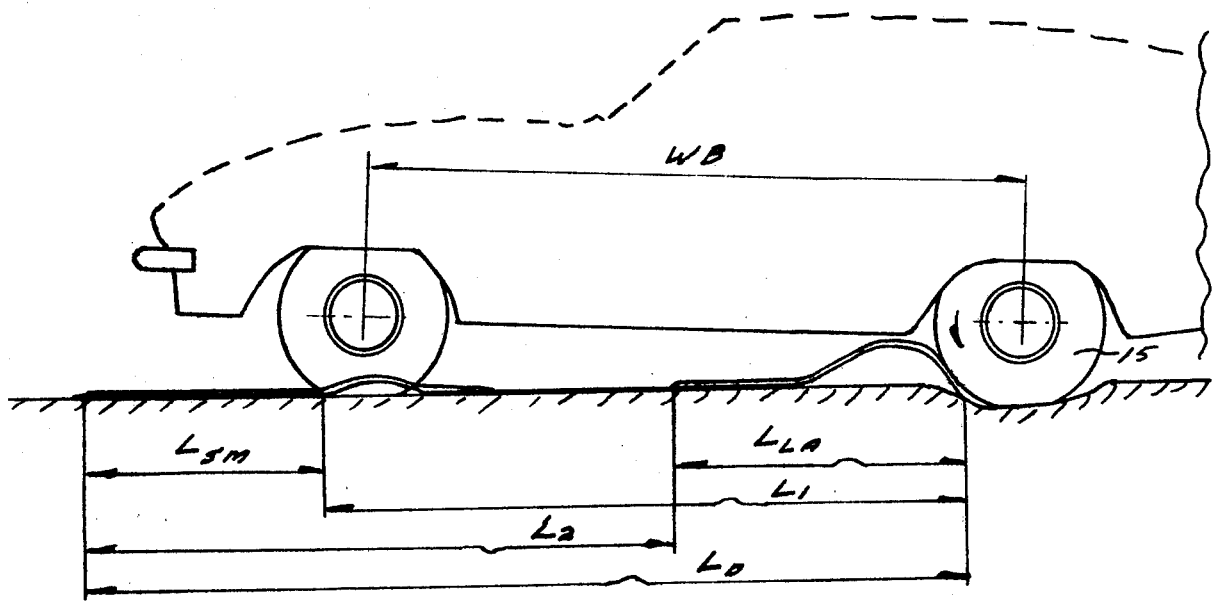
FIG. 5 is a side elevational view of the invention positioned on a passenger car having a relatively long wheelbase and depicting length dimensions as elaborated upon in the description.

FIG. 5 shows the anti-wheel spin device about to be operative on a passenger car having a relatively long wheelbase. It also designates lengths of components for purposes of formulating desired design criteria. Firstly, in view of its reversability as described, it would be clear that both lengths $L_1$ and $L_2$ of the device, being operative for "large" and "small" vehicles respectively, must exceed a corresponding vehicle wheelbase by a certain amount. A certain minimum amount would be represented by the loop shown in front of the driving wheel 15, should it be assumed that the vehicle as shown represents the longest wheelbase, WB max, desirable to serve. If that amount of slack is denoted as length $L_s$ — not shown in the drawing — and further that it is to be equal when the device is being used in its reverse mode on a vehicle having a mid range length wheelbase, WB mid, the following length-formulae are arrived at:

$$L_1 = WB_{max} + L_s;$$

$$L_2 = WB_{mid} + L_s;$$

from which the distances $L_1$ and $L_2$ are each determined after assigning a value of $L_s$, which has been found should be some 8 to 15 inches.

By further assigning a certain "safe" dimension to length $L_{sm}$ to accommodate the shortest wheelbase to be served, for the shorter matting 11 — being operative while extricating "smaller" vehicles — the overall length $L_0$ is then determined from:

$$L_0 = L_{sm} + L_1;$$

it has been found the $L_{sm}$ should be some 35 to 45 inches.

Finally, length of the longer matting 10 — having dimension $L_{LA}$ — is determined from:

$$L_{LA} = L_0 + L_2.$$

Further now, in regard to positioning of the device before operation, its configuration lends itself well to also accommodate having the front wheels turned, should the situation of the vehicle so dictate. The front mattings are then merely laid and tucked in the desired direction, as generally illustrated by the dotted positions of these mattings in FIGS. 3 and 4.

Although the foregoing description of the invention is generally applicable, the FIGS. 1 through 5 show a configuration suitable primarily to lighter weight vehicles such as passenger cars, vans, pick-up trucks and the like as this being the least costly configuration. Here the preferred material for the coupling means 12 has inherent characteristics from which the details of the design may be altered to become a useful convenience anti-wheel spin device also for heavier weight rubber tired vehicles such as on-and-off highway trucks and farm tractors. Such alternative designs are shown by FIGS. 6 and 7.

Figure 6:
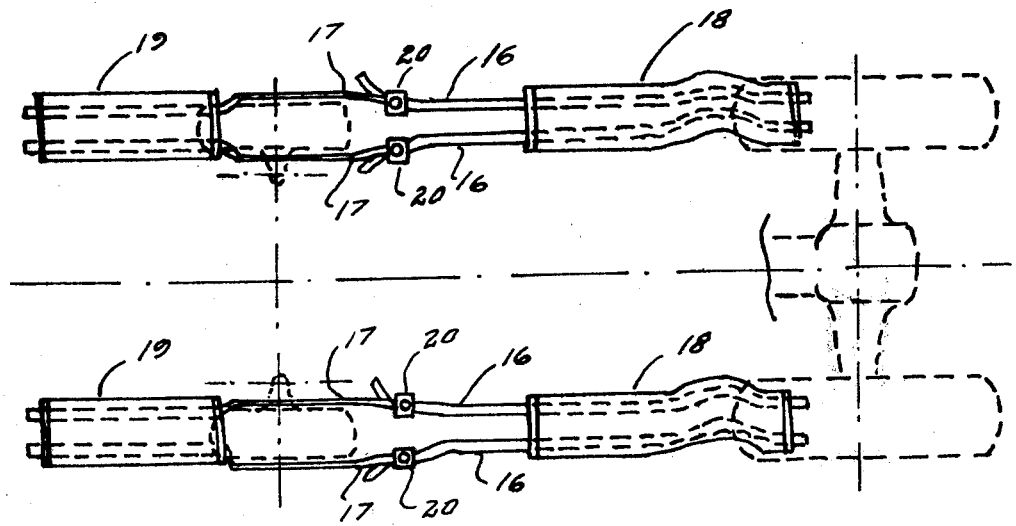
FIG. 6 is a top plan view of the device as constructed for and positioned on a relatively heavy vehicle such as a farm tractor or a truck.
Figure 7:
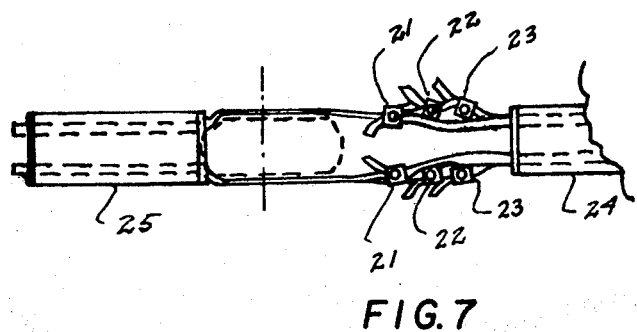
FIG. 7 is a top plan view of a portion of the device generally constructed as per FIG. 6 but as an alternative intended for use on particularly heavy vehicles.

FIG. 6 is depicted to illustrate the design for a farm tractor. Here, due to such vehicles' generally heavier weight and wider tires, dual coupling means 16 and 17, and relatively wider mattings 18 and 19, are provided and located as illustrated. The combined breaking strength of the coupling means 16 and 17, using Type 1 seat belt webbing would be 2 × 6000 lbs. or 12,000 lbs. Coupling means 16 and 17 are provided with buckle means 20 designed and manufactured according to the specifications set forth — again in SAE Standard J4c for seat belt assemblies — such buckles being readily commercially available. The positioning of this device prior to operation is the same as described in the foregoing with the exception that here the two assemblies are tucked into place separately and then locked together as illustrated.

It should be noted that although clearly the configuration as shown in FIG. 6 is more costly than that in the preceding figures, this does not preclude its potential usage also for lighter weight vehicles such as passenger cars, vans, and pick-up trucks.

Further in this latter alternate design, since the buckle means 20, as specified in the foregoing, not only contain locking means but also adjusting means for the coupling means 17 as indicated in FIG. 6, a wider range of wheelbases may be served by combining (a) this inherent feature of buckle means 20 and (b) the "excess" length provided for in matting 18 in accordance with the foregoing formulae, thusly obtaining this added utility at the cost of providing some additional length in coupling means 17.

Referring to FIG. 7 additional breaking strength of the coupling means may be achieved by glueing together, essentially under the matting portions only of the device, two or more strips of seat belt webbing and simultaneously furnish each of them with individual buckle means 21, 22, and 23 as well as providing for commensurate added strength in matting means 24 and 25 and in the fastening means between mattings and coupling means. The f them with individual buckle means 21, 22, and 23 as well as providing for commensurate added strength in matting means 24 and 25 and in the fastening means between mattings and coupling means. The combined breaking strength of the coupling means, as illustrated in FIG. 7, using dual strips of three layer seat belt webbing, Type 1, would result in breaking strength of approximately 6 × 6000 or 36,000 lbs. Although adjusting the six individual coupling means to an equal length would be a somewhat critical adjustment the favorable elongation characteristics specified for this material will alleviate the significance of that requirement. It is visualized that a version such as shown in FIG. 7 can be useful for heavy vehicles such as off-highway trucks.

Referring now to FIGS. 8, 9 and 10, there is shown an anti-wheel spin device 100 with a winching accessory including a tire strap assembly 200, and a driving wheel 50 and a non-driving wheel 51. Combined, and working together, these make one winching device.

The assembly 200 includes a piece of Type 1 or 2 seat belt webbing 13a, adjustable coupling means 14a and 15a attached thereto, and a piece of hose 16a. The webbing 13a is of the same general kind as is being used for connecting the matting means 10 and 11 of the device 100. Coupling means 14a and 15a are of the general kind being used for connecting the matting means 18 and 19, as shown in FIG. 6, for example, there designated by numeral 20. Hose 16a is any kind of hose, capable of withstanding the weight of a driving wheel without rupture over a wide range of temperatures and having a length approximately equal to the width of mattings 10 and 11. The hose 16a is slidably inserted around webbing 13a for the main purpose of protecting the traction matting 10 from damage during this mode of usage.

Referring to FIG. 11 anchoring shoe 17a is an integral part of matting 10 and 11 to provide secure anchoring in front on non-driving wheel 51 — even if this rests on wet and smooth ice. Shoe 17a is an elastomer material and contains a recess 18a on its top side. The recess 18a is large and deep enough to provide space for folding webbing 12 backwards — prior to positioning matting — for purpose of establishing elastomer contact or rubber-to-rubber bite between matting 11 and the non-driving wheel 51.

Both mattings 10 and 11 contain transverse corrugations 19a on the side opposite of shoe 17a. Either matting may be used for anchoring or for traction, depending upon the length of wheelbase — as previously disclosed. When used as anchoring matting, corrugations 19a face the ground to enhance anchoring force; when used as traction matting, corrugations 19a face the driving wheel to enhance the coefficient of traction. Although not illustrated, it should be recognized that the corrugations may have other shapes — such as V shapes — thus then designed to provide similar function as do generally V-shaped ribs, typically found on rubber tired industrial and construction vehicles.

In extricating a mired vehicle such as a car, van, camper, or pick-up truck, the procedure, using the winching accessory, is as follows: The matting 11 positioned firmly in front of wheel 51, webbing 12 is first folded flat upon itself or backwards, as described. The webbing is then laid along the outside of wheel 51. Matting 10 is then folded downwards in front of wheel 50 as shown in FIGS. 8 and 10 in a way to avoid any appreciable slack in the webbing 12 between wheels 50 and 51 when tire strap assembly 200 has been installed. Tire strap 13a of assembly 200 is now slipped through the nearmost wheel slot or spoke in wheel 50; the hose 16a slid around it; the matting 10 folded downward over hose 16a and laterally adjusted so that it centers tha matting 10 (FIG. 10), whereafter the tire strap 13a is coupling together by coupling means 14a and 15a. The buckle 15a contains adjustment means so that strap 13a may be tightened securely around wheel 50 by merely pulling at the free end of the strap.

Since the vehicle incorporates a differential mechanism between the two driving wheels, as discussed previously, the same procedure must, with the winching accessory, be repeated for the opposite side of the vehicle, which is then ready to be extricated. The vehicle transmission is engaged in low forward gear on vehicles with rear wheel drive (or in case of front wheel drive vehicles, the reverse gear is engaged). As the driving wheel 50 begins to rotate, the hose 16a will become a fulcrum (as shown in FIG. 8), around which the wheel will revolve. As both driving wheels are similarly connected to device 100, the vehicle will winch itself out of its predicament. In so doing, the matting 10 will be wound up upon the wheel 50 as the vehicle proceeds. When the wheel 50 revolved to a position essentially as shown in FIG. 12, the vehicle is stopped. Upon releasing coupling means 14a and 15a the strap assembly 200 and the device 100 may be retrieved.

It should be noted that the downward fold in the matting 10 will be maintained as the vehicle is extricated. Firstly, by virtue of a downward force toward the ground, exerted by strap 13a as the wheel 50 begins to rotate thus wedging the fold around the hose 16a. Subsequently, this wedging force is being maintained by virtue of the strain being built up between mattings 10 and 11 in the process of overcoming the vehicle's resistance to be moved. The latter force causes the strap 13a to take a biased position around the tire 50 as shown in FIG. 12 and thus securely clamps the matting 10 to the tire of the driving wheel 50 in a self-energizing fashion. The design of the coupling means 14a and 15a is such, that they be expeditiously uncoupled even when strap 13a has been subjected to high strain.

The "extricating capacity" of an arrangement as described above in determined essentially by three factors, namely, (a) component breaking strength of device 100 and assembly 200 and (b) initial and prevailing anchoring force provided by matting 11 and (c) amount of vehicle rim-pull available; all three factors as set forth below:

(a) In regard to breaking strength, it should be noted that both device 100 and assembly 200 incorporate seat belt webbing, throughout and that the coupling means are commercially available seat belt buckles and of commensurate strength;

(b) In regard to anchoring force, the relatively large thickness of anchoring shoe 17a provides for effective initial wedging between the ground and the non-driving wheel 51, making the initial anchoring force approach that of the weight exerted upon it. As the vehicle proceeds, its resistance to movement is diminished and the anchoring force is adequately maintained and enhanced, by virtue of the favorable gripping characteristics provided by the transverse corrugations 19a of matting 11 against the ground surface; and (c) In regard to available vehicle rim-pull, this value is most generally of such a large magnitude that an adequate reserve amount exists even for particularly adverse predicaments.

Figure 13:
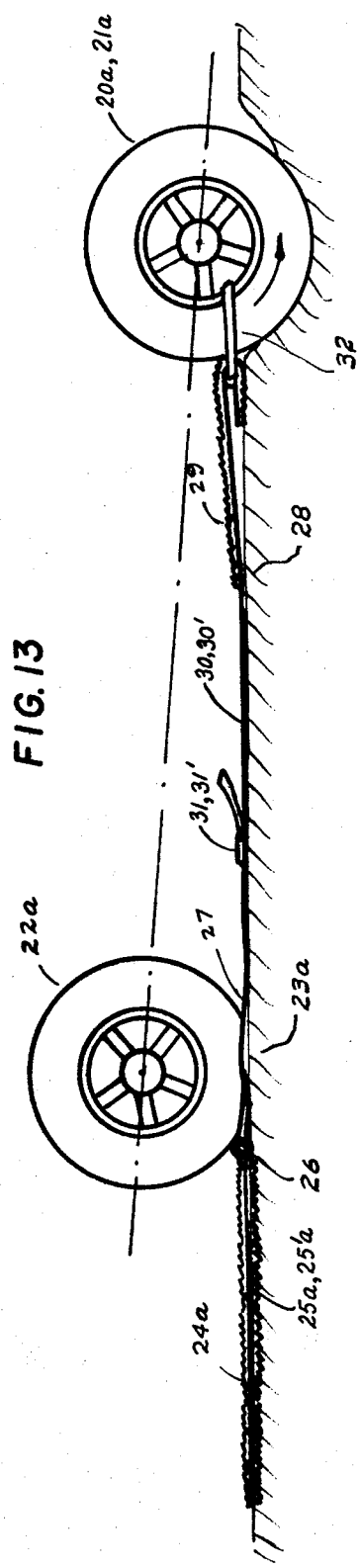
FIG. 13 is a side elevational view of the device, with winching accessory, as constructed for and positioned on a vehicle having dual driving wheels.
Figure 14:
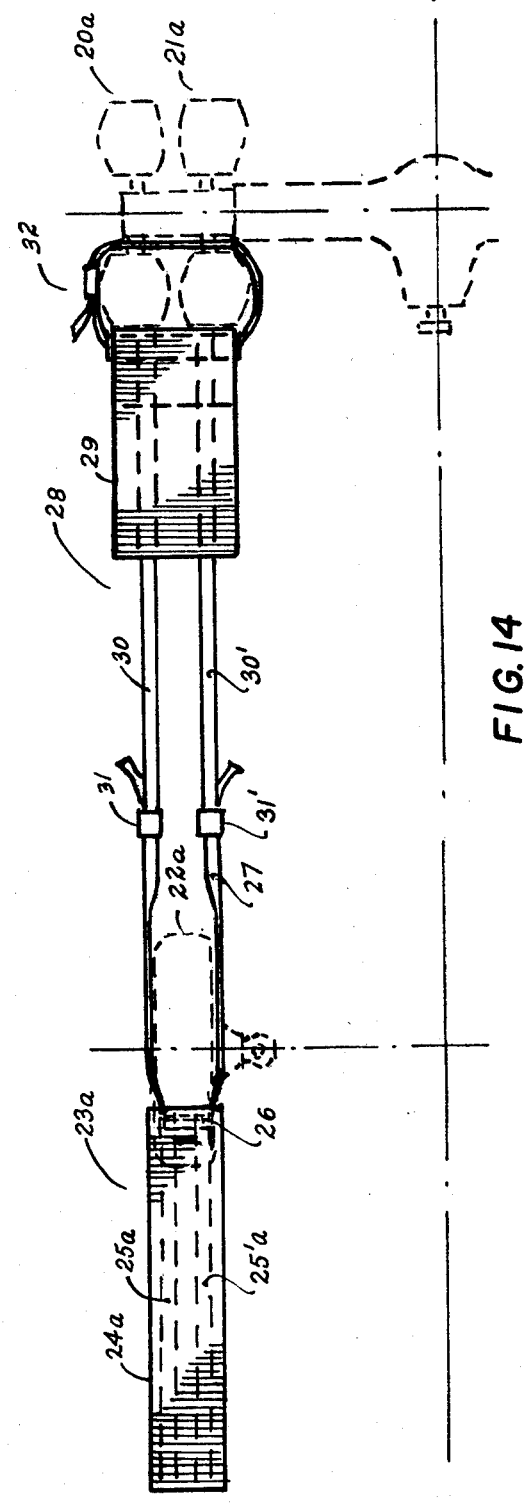
FIG. 14 is a top plan view of the device shown in FIG. 13.

With these observations in mind it is easily understood that the described concept may also be adopted for extricating heavier rubber tired vehicles if they are stuck not only in snow or on ice but also when mired in mud, etc. Such an embodiment is shown in FIGS. 13 and 14, being used on a truck having dual driving wheels 20a and 21a and non-driving wheels 22a. The anchoring matting assembly 23a consists of matting 24a, dual strands of seat belt webbing 25a and 25a', imbedded in matting 24a, hose 26, securely adhered and surrounded by the seat belt webbing 25a and 25a', and webbing 27 being slid through the hose 26 as shown. The traction matting assembly 28 consists of matting 29, transversely corrugated on its top side only, dual strands of seat belt webbings 30 and 30' imbedded in matting 29 and adjustable coupling means 31 and 31'. The strap assembly 32 is similarly constructed as is assembly 200 previously described. In extricating a heavier vehicle, such as a dual tired truck, the procedure, using the winching accessory, is as follows, referring to FIGS. 13 and 14: The anchoring matting assembly 23a is first uncoupled from traction matting assemby 28, using the coupling and length adjusting means 31 and 31'. The anchoring matting 24a is positioned firmly against the non-driving wheel 22a and the webbing 27 is laid along both sides of it as shown in FIG. 14. The traction matting assembly 28 is laid in front of driving wheels 20a and 21a, with a downward fold in matting 29 as shown in FIG. 13. Winching assembly 32 and matting 29 are then arranged and coupled as described above with reference to FIGS. 8, 9 and 10. The assemblies 23a and 28 are then coupled together and length adjusted to avoid any appreciable slack with means 31 and 31'.

With the construction as shown in FIGS. 13 and 14 the breaking stength has been essentially doubled from that as shown in FIGS. 8 through 12. Referring to strength data given above, this configuration would thus give a minimum breaking strength of 10,000 pounds each using Type 2 webbing material or 20,000 pounds per set representing a truly high capacity "winch" for its weight and rolled up size.

As can be understood, it is entirely practical to construct devices with further doubling in strength, while following same general design concept.

While the invention has been described in detail with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best modes contemplated for carrying out this invention, but that the invention will include all embodiments falling within the scope of the appended claims.

What is claimed is:

1. A device for providing a traction surface under the wheels of immobile vehicles and adapted for use with vehicles having different wheelbases comprising
   a first flexible traction means having two ends, one of said ends terminating in a tapered end having a thickness less than the thickness of any other portion of said first traction means for engaging a portion of a driving vehicle wheel,
   a second flexible traction means having two ends, one of said ends terminating in an end having a thickness greater than the thickness of any other portion of said second flexible traction means forming an abutment for engaging a portion of a non-driven vehicle wheel, and
   coupling means joining said abutment forming end of said second flexible traction means to said first flexible traction means at the end opposite to said tapered end for holding said second flexible traction means in a fixed position against a non-driven vehicle wheel during engagment of said first flexible traction means by a driven vehicle wheel of a vehicle having a predetermined wheelbase,
   said abutment forming end of said second flexible traction means being wedge-shaped with the base of said wedge positionable against a portion of a non-driven vehicle wheel and having a recess formed therein extending inwardly from said wedge base and being sized so as to receive therein a portion of said coupling means joined thereto and folded toward the other end of said second flexible tractior means to facilitate abutting said second flexible traction means against a non-driven vehicle wheel to secure said first flexible traction means when engaged by a driven vehicle wheel.

2. The apparatus of claim 1 wherein said coupling means comprises a flat, flexible and foldable element.

3. The apparatus of claim 2 wherein said flat, flexible and foldable element includes means carried between the joined ends of said first and second traction means for selectively joining one to the other.

4. The apparatus of claim 1 wherein the other end of said second flexible traction means terminates in a tapered end having a thickness less than the thickness of any other portion of said second traction means for engaging a portion of a driven vehicle wheel, and the end of said first traction means joined to said coupling means terminates in an end having a thickness greater than the thickness of any other portion of said first traction means forming an abutment for engaging a portion of a non-driven wheel such that said second flexible traction means is held in a fixed position during engagement by a driven wheel of a vehicle having a wheelbase different from said predetermined wheelbase.

5. The apparatus of claim 4 wherein said abutment forming end of said first flexible traction means is wedge-shaped with the base of said wedge positionable against a portion of a non-driven vehicle wheel and having a recess formed therein extending inwardly from said wedge base to receive therein a portion of said coupling means joined thereto to facilitate abutting said first flexible traction means against a non-driven vehicle wheel to secure said second flexible traction means when engaged by a driven vehicle wheel.

6. The apparatus of claim 1 wherein said first flexible traction means extends a length different than the length of said second flexible traction means to accommodate vehicles having differing wheelbases.

7. The apparatus of claim 1 wherein said first and second flexible traction means each include traction enhancing means formed thereon, said traction enhancing means formed on said first flexible traction means in a position to engage a driving wheel to increase the traction force thereof, and said traction enhancing means formed on said second flexible traction means in a position to engage the surface upon which the vehicle is supported to increase the tractive anchoring force.

8. The apparatus of claim 1 further including winch forming means for releasably securing said first flexible traction means to a vehicle driving wheel forming a winch for removing the immobile vehicle.

9. The apparatus of claim 8 wherein said winch forming means includes flexible coupling means for releasably securing said winch forming means to said driven vehicle wheel and bushing means supported on a portion of said flexible coupling means.

10. A method of installing a traction aid for use in extricating a vehicle mired in mud, snow, sand or the like comprising the steps of placing a first elastomeric anchoring mat having corrugations on at least one side and a wedge abutment portion having a recess formed therein on an end of said mat against the forward portion of a non-driving vehicle wheel with the corrugations engaging the surface supporting the vehicle and the wedge abutment portion with the recess formed therein in contact with the non-driving vehicle wheel, placing a second elastomeric traction mat coupled to said first elastomeric anchoring mat by a flat and flexible connector and having corrugations on one side and a tapered portion on an end thereof against the forward portion of a power driven vehicle wheel with the corrugations and the tapered portion engaging the power driven vehicle wheel, and folding the flat flexible connector joining the first and second elastomeric anchoring and traction mats toward the first anchoring mat into the recess formed in the wedge abutment then transverse to the non-driving vehicle wheel to a position on an outer side thereof and then along the outer side of the non-driving wheel toward the second elastomeric traction mat thereby firmly holding both mats in position while the vehicle is extricated.

11. A device for providing a traction surface under the wheels of immobile vehicles and adapted for use with vehicles having different wheelbases comprising a first flexible traction means having two ends, one of said ends terminating in a tapered end having a thickness less than the thickness of any other portion of said first traction means for engaging a portion of a driving vehicle wheel, a second flexible traction means having two ends, one of said ends terminating in an end having a thickness greater than the thickness of any other portion of said second flexible traction means forming an abutment for engaging a portion of a non-driven vehicle wheel, coupling means joining said abutment forming end of said second flexible traction means to said first flexible traction means at the end opposite to said tapered end for holding said second flexible traction means in a fixed position against a non-driven vehicle wheel during engagement of said first flexible traction means by a driven vehicle wheel of a vehicle having a predetermined wheelbase, and winch forming means including a flexible coupling for releasably securing said winch forming means to a vehicle driving wheel with a portion of one of said flexible traction means being folded upon itself passing between said flexible coupling and said vehicle driving wheel to form an operative connection thereto.

12. The apparatus of claim 11 further including bushing means supported on a portion of said flexible coupling in contact with said flexible traction means for defining the radius of curvature about which said flexible traction means is folded upon itself.

* * * * *

UNITED STATES PATENT OFFICE
CERTIFICATE OF CORRECTION

Patent No. 4,133,480　　　　　　　　　Dated January 9, 1979

Inventor(s) Thorvald G. Granryd

It is certified that error appears in the above-identified patent and that said Letters Patent are hereby corrected as shown below:

Column 4, line 57, "$L_{LA} = L_0 + L_2.$" should read -- $L_{LA} = L_0 - L_2.$ --;

Column 6, line 54, the word "coupling" should read -- coupled --;

Column 9, line 3, the word "tractior" should read -- traction --.

Signed and Sealed this

First Day of May 1979

[SEAL]

Attest:

RUTH C. MASON
Attesting Officer

DONALD W. BANNER
Commissioner of Patents and Trademarks